Patented May 19, 1953

2,639,294

UNITED STATES PATENT OFFICE 2,639,294

METHOD OF PRODUCING N-SUBSTITUTED DERIVATIVES OF 4-AMINO-2-HYDROXYBENZOIC ACID

Karl-Gustaf Rosdahl, Malmo, Sweden, assignor to Aktiebolaget Ferrosan, Malmo, Sweden, a corporation of Sweden No Drawing. Application December 10, 1948, Serial No. 64,716. In Sweden December 11, 1947

2 Claims. (Cl. 260—519)

The present invention refers to a method of producing N-substituted derivatives of 4-amino-2-hydroxybenzoic acid.

By extensive clinical researches it has been possible to establish that 4-amino-2-hydroxybenzoic acid possesses a bacteriostatic activity on the tubercle bacillus and therefore constitutes a valuable remedy for tuberculosis. In addition to the said compound itself derivatives thereof have also proved active.

The principal object of the present invention is to provide a method of producing a certain group of such bacteriostatically active derivatives of 4-amino-2-hydroxybenzoic acid, viz. such in which an organic group has entered as a substituent in the amino group.

Another object of the invention is to provide a method of producing a group of such bacteriostatically active derivatives of 4-amino-2-hydroxybenzoic acid, in which lower alkyl group has entered as a substituent in the amino group.

The method according to the present invention generally comprises the feature that 4-amino-2-hydroxybenzoic acid is treated with compounds composed of organic radicals having inorganic detachable constituents bonded thereto, whereby the N-substituted derivatives of 4-amino-2-hydroxybenzoic acid corresponding to said organic radicals are formed.

To illustrate the invention, some examples thereof will now be described.

Example 1

To 18.9 grams of 4-amino salicylic acid hydrochloride are added 200 cm.$^3$ of 1N sodium hydroxide and equal parts of water. The mixture is shaken, until all the substance has gone into solution, and there are then added to it 9.5 cm.$^3$ of dimethyl sulfate. After some minutes shaking a precipitate is momentarily obtained which is filtered off and recrystallized from 96% alcohol. The product has a melting point of 119° C. The composition corresponds to 4-N-methylamino-2-hydroxybenzoic acid.

If the dimethyl sulfate in the above example is replaced by other dialkyl sulfates, analogous compounds having two, three or more carbon atoms in the N-substituent may be produced. Instead of sulfates the corresponding halogen compounds may be used.

What I claim and desire to secure by Letters Patent is:

1. A method of producing N-substituted alkyl derivatives of 4-amino-2-hydroxybenzoic acid having not more than three carbon atoms in the N-substituent, which comprises mixing 4-amino-2-hydroxybenzoic acid with a member of the group consisting of dialkyl sulfates having one, two and three carbon atoms in each alkyl group in an alkali metal hydroxide solution, whereby the N-substituted alkyl derivative of 4-amino-2-hydroxybenzoic acid corresponding to the dialkyl sulfate used is formed and due only to the step of mixing the reagents.

2. A method of producing 4-N-methylamino-2-hydroxybenzoic acid, comprising mixing 4-amino-2-hydroxybenzoic acid with dimethyl sulfate in an alkali metal hydroxide solution, whereby 4-N-methylamino-2-hydroxybenzoic acid is formed and due only to the step of mixing the reagents.

KARL-GUSTAF ROSDAHL.

References Cited in the file of this patent

UNITED STATES PATENTS

| Number | Name | Date |
|---|---|---|
| 1,426,380 | Haworth | Aug. 22, 1922 |
| 1,431,470 | Lapworth | Oct. 10, 1922 |
| 1,570,203 | Cade | Jan. 19, 1926 |

FOREIGN PATENTS

| Number | Country | Date |
|---|---|---|
| 3,182 of 1893 | Great Britain | Dec. 2, 1893 |

OTHER REFERENCES

Hubner, Analen, vol. 195, p. 37 (1879).

Rana, J. Ind. Chem. Soc., vol. 19, pp. 299–302 (1942).

Sidgwick, Organic Chemistry of Nitrogen, Oxford Press, London, England, 1937, pp. 57, 58.

Webster's New International Dictionary, 2nd. Ed. Unabridged, G. and C. Merriam Co., Springfield, Mass., 1939, p. 66.